Oct. 16, 1945. J. W. WRIGHT 2,387,222
METHOD OF REFINING GLASS
Filed Sept. 17, 1941

INVENTOR
Joseph W. Wright,
BY
Rule and Hoge.
ATTORNEYS

Patented Oct. 16, 1945

2,387,222

UNITED STATES PATENT OFFICE 2,387,222

METHOD OF REFINING GLASS

Joseph W. Wright, Alton, Ill., assignor to Owens-Illinois Glass Company, a corporation of Ohio Application September 17, 1941, Serial No. 411,170

6 Claims. (Cl. 49—54)

My invention relates to a novel method and apparatus for use in the process of melting and refining glass and other materials. The invention is particularly adapted for use in connection with so-called continuous tanks in which the operations of melting and refining glass are carried on continuously. Such tanks are usually of large capacity, containing many tons of the material which is being melted and refined. Heat for melting the batch is applied in the form of flames or gases of combustion applied to the surface of the material. The raw batch is introduced at one end of the tank and is gradually melted and refined as it advances slowly lengthwise of the tank. In the melting process a large number of minute gas bubbles are introduced or generated within the mass of viscous material and these must be eliminated before the glass is in suitable condition for use. Owing to the viscous nature of the glass, the upward movement of these seeds to the surface is slow. In the melting operation convection currents are set up through the mass and these tend to produce cords or streaks throughout the glass which, unless eliminated, result in defective ware. It is also necessary to reduce the molten material to a uniform homogeneous consistency before it is suitable for the manufacture of commercial ware.

An object of my invention is to provide a novel method and means for facilitating the melting and refining operations by producing a controlled circulation or movement of the glass in the tank in a manner to control the convection currents, produce a comparatively rapid discharge of the seeds or bubbles, and promote a better homogeneity of the glass.

A more specific object of the invention is to provide a method and apparatus for introducing a gas or gas-forming material into the melting tank, preferably through the floor thereof, and causing a series of gas bubbles to rise through the molten mass in a manner to control convection currents, cause a rapid discharge of seeds from the glass, produce a homogeneous condition of the mass, and materially reduce the amount of fuel required.

In the melting of glass in tank furnaces the quantity of molten glass drawn from the furnace and likewise the quantity of batch materials fed into the furnace vary in amount, depending upon the size and weight of glass articles being manufactured or the number of blowing machines drawing glass from the tank. This variation in the rate of melting causes changes in the convection currents of the molten material within the furnace and such changes are accompanied with changes in the homogeneity of the glass. An object of the present invention is to control the convection currents and the movement of glass within the tank in a manner to reduce or eliminate such changes in the homogeneity and produce a glass which is uniform throughout.

In furnaces where convection currents are controlled primarily by heat distribution, the surface glass near the discharge end of the furnace has been found periodically to contain an excess of silica and a deficiency in the balance of the glass constituents. An object of my invention is to provide means for controlling the convection currents in such a manner that an excess of silica in the surface glass near the discharge end of the tank is prevented and a more homogeneous product is obtained.

Other objects of the invention will appear hereinafter.

Referring to the accompanying drawing.

Figure 1:
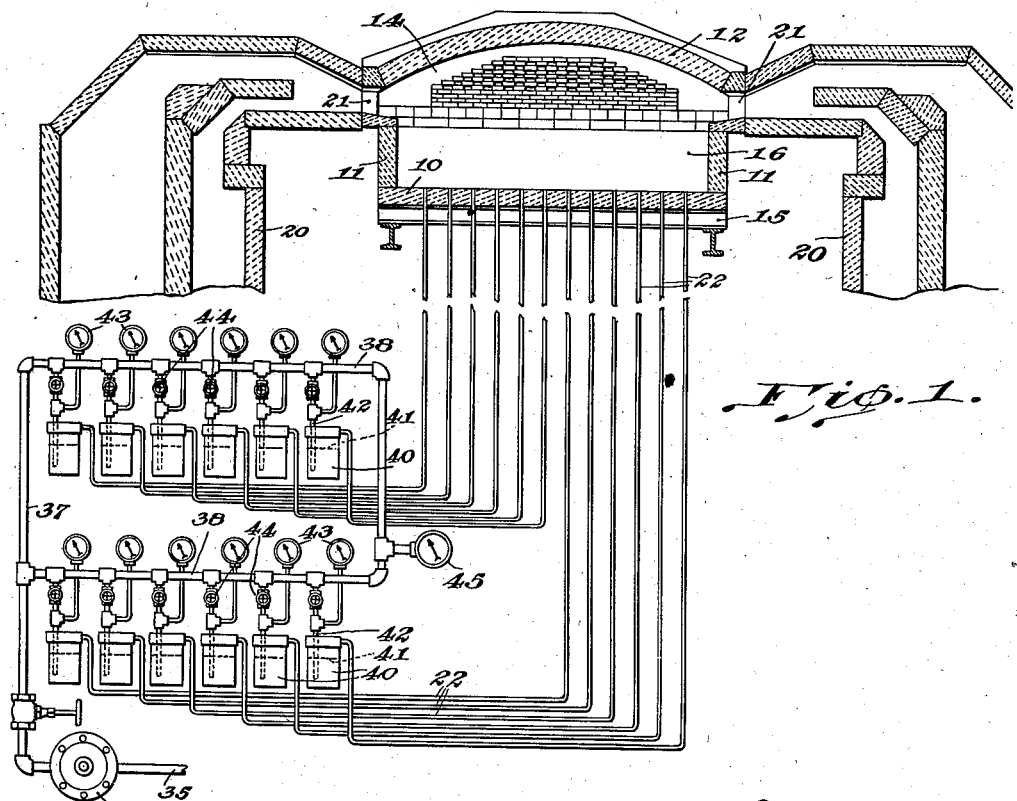
Fig. 1 is a cross-sectional elevation of a glass melting and refining tank equipped with apparatus for practicing the present invention.
Figure 2:
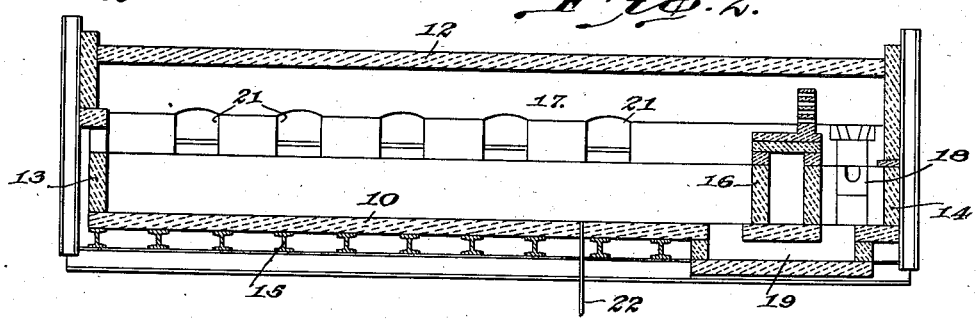
Fig. 2 is a longitudinal sectional elevation of the tank.

The tank, which may be of conventional construction, comprises a floor 10, side walls 11, a roof 12, and end walls 13 and 14, all made of refractory material. The furnace may be supported as usual by a metal framework or structure 15. A bridge wall 16 separates the main or melting compartment 17 from the conditioning or refining compartment 18, said compartments being in communication through a conduit 19 extending beneath the bridge wall. The raw batch materials may be introduced through openings in the end wall 13 and are melted and refined to some extent as they advance slowly through the compartment 17. The molten metal then passes through the conduit 19 into the conditioning chamber 18 where it is further refined and conditioned before it is withdrawn or discharged from the tank. Heat for melting the glass is supplied from regenerators 20 from which hot gases are discharged through ports 21 which open into the melting compartment above the level of the glass, said ports being arranged at intervals along both sides of the furnace. The furnace as above described is of well known construction and is not per se a part of the present invention.

Figures 3, 4:
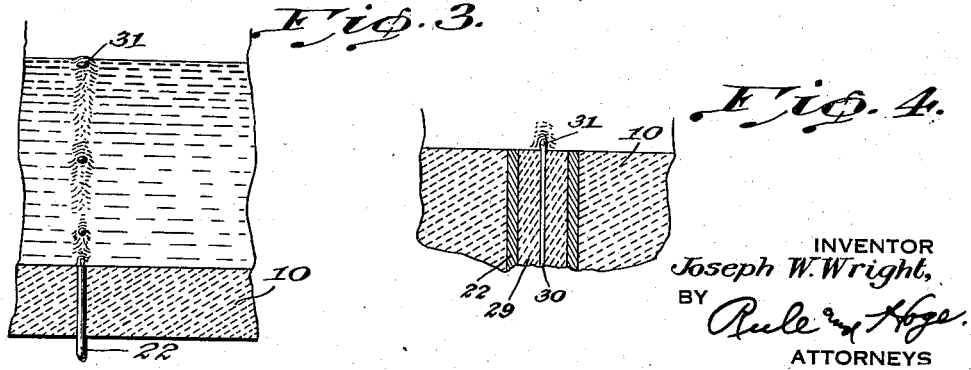
Fig. 3 is a fragmentary sectional view showing means for conducting gas through the floor of the tank.
Fig. 4 is an enlarged view showing the end portion of the pipe shown in Fig. 3.

In accordance with my invention I provide a series of pipes 22 or gas line which lead to and extend upwardly through the floor of the furnace and through which gas is discharged in the form of bubbles liberated at regular and controlled intervals within the molten glass. These pipes may be made of cast iron, platinum, platinum-rhodium alloy, nickel or other metal or alloy resistant to the action of the molten glass. As shown in Figs. 3 and 4 the pipes terminate at the floor surface. Within each metal pipe is a refractory material 29 formed with a central opening or passageway 30 through which the gas is conducted into the furnace.

The gas as it flows upward through the passageway 30 forms a bubble 31 within the molten glass at the mouth of the tube, the size of the bubble being dependent primarily on the surface tension of the glass and in a measure on the shape of the tube or conduit at its discharge end. When the bubble reaches a certain size it will break loose from the end of the tube and commence to rise toward the surface of the glass. This upward movement of the bubble causes the comparatively viscous metal which envelops it to move upward therewith. This upward pull or movement of the glass is confined mainly to the portion thereof immediately adjoining the bubble.

The gas supplied by each pipe is liberated within the glass in a succession of bubbles 31 formed at intervals which may be controlled and regulated by regulating the pressure of the gas. These bubbles, which may be substantially spherical when released from the pipe 22, gradually expand as they rise and are also flattened out before they are discharged at the surface of the glass.

The pipes 22 are preferably arranged in a row extending transversely of the furnace, this row being at right angles of the general direction of movement of the glass through the furnace. The pipes as shown are placed nearer to the discharge end than the receiving end of the tank. It will be seen that with a row of pipes thus arranged and discharging gas bubbles at short intervals, there will be a continuous upward movement of these bubbles, all in a substantially vertical plane and distributed at short intervals throughout the area of the glass within such plane. Thus there is produced a rising curtain of molten glass which is drawn upwardly with the gas bubbles. As a result the metal which would ordinarily travel along or adjacent to the bottom of the furnace is moved upward toward the surface where the higher furnace temperature and greater fluidity of the glass allow a comparatively rapid release of the entrapped gases, thus materially aiding in the fining process.

At the same time this movement of the glass in the form of a rising curtain serves to prevent a rapid and continuous movement of the surface glass and batch materials directly from the charging end of the furnace to the conditioning chamber 18. The action is such as to prevent stagnation of the lower strata of glass in the furnace and to insure the thorough mixing of the materials during the melting process while directing the convection currents and preventing the formation of cords, streaks and other conditions which would result in lack of homogeneity in the final product. The controlled circulation of glass in accordance with the present invention also accelerates the melting and refining operations and results in a substantial saving in fuel and increased melting capacity.

The gas bubbles which are liberated within the glass in accordance with the present invention are comparatively large and break immediately upon reaching the surface of the glass, and hence do not introduce small seeds or bubbles into the molten mass. The particular type of gas used may vary, depending on whether it is desired to use an oxidizing, a reducing or a neutral gas for the purpose of reacting on the glass. For example, where the glass batch contains iron, an oxidizing gas may be used for oxidizing the iron. A reducing gas may be used to retain certain coloring compounds. A neutral gas may be employed where it is desired to avoid any changes in the state of the chemical contents comprised in the glass.

Although I have found it practical to use a gas supplied through pipes from a tank or reservoir in which the gas is stored under pressure, the invention is not limited to the use of gas in this form. Gas-forming elements or compounds as, for example, water, ammonium nitrate, ammonium sulphate, sodium chloride, arsenic and other materials which readily form gas, may be satisfactorily used where such materials are delivered under properly controlled conditions.

Referring to Fig. 1, air or other gas may be supplied under pressure through a pressure pipe 35, reducing valve 36 and a pipe 37 to manifold pipes 38. The manifold pipes are in communication with the pipe lines 22 through sealed containers or "bubbling tubes" 40 individual to said lines. Each container is partly filled with oil 41 or other liquid. The gas under pressure passes from the manifold through pipes 42 extending downward through the sealed upper ends of the containers into the liquid therein. The rate at which the gas flows is clearly shown by its bubbling through liquid in said containers. Pressure gauges 43 individual to the pipes 42 indicate the pressure. Valves 44 in the pipes 42 provide means for throttling or cutting off the flow through any selected line 22. A gauge 45 indicates the pressure in the manifolds.

The rate of flow of gas may be varied throughout a rather wide range. In commercial operations I have obtained satisfactory results with rates of flow ranging from as low as six bubbles per minute released from each line, up to 100 or more. The most satisfactory rate of flow depends upon variable factors met with in the melting and fining operations such as size of the tank, depth of the glass, composition of the glass batch, temperatures at which the glass is drawn from the furnace and other factors.

Modifications may be resorted to within the spirit and scope of my invention.

I claim:

1. The method of producing a localized movement of molten metal in a body of said metal which comprises introducing gas bubbles into said body, causing said bubbles to be distributed throughout a vertically disposed curtain-like zone within said body, thereby producing an upward movement of a curtain-like portion of the metal within said zone caused by gravitational forces applied through the metal and producing an upward movement of said bubbles and an upward drag therewith of the enveloping metal, and restricting the application of gas bubbles to said zone.

2. The method which comprises applying to a body of molten glass, localized forces at a multiplicity of spaced points distributed at intervals throughout a predetermined vertical plane extending through said body, all of said forces being applied in substantially parallel lines and in the same direction within said plane, and maintaining the glass in the vicinity of said plane free from like forces and in a comparatively quiescent condition whereby a sheet or curtain of molten glass is defined and caused to flow in the said direction in which said forces are applied.

3. The method of melting and fining glass by a continuous process which comprises introducing glass batch material into a tank at one end thereof, withdrawing molten glass from the other end of the tank, applying surface heat to the batch in the tank and thereby melting and fining the material as it advances through the tank, introducing gas into the tank through the bottom thereof at predetermined points spaced at short intervals in a line extending transversely of the tank and remote from the ends of the tank and of the body of glass therein and causing said gas to move upwardly from the bottom of said body through the molten glass in the form of a succession of bubbles liberated at each opening and substantially confined to the vertical plane of said line during their upward movement through the body of glass, and confining the gas supplied through the bottom of the tank to said transverse line.

4. The method which comprises introducing glass batch materials into a tank furnace at one end thereof and causing the batch to move forward through the tank, applying heat to the upper surface of the materials within the tank and thereby melting them and causing a more fluent condition of the surface portions of the glass than of that at a greater depth and thereby tending to produce a comparatively rapid forward movement of said surface portions, applying gas under pressure to the bottom of the body of glass in the tank at points distributed along the bottom of the tank in a single line extending transversely of the tank and confining the application of gas at the bottom of said body to said line, and thereby causing gas bubbles to be liberated at said points and to rise through the molten glass in substantially a single vertical plane and apply an upward force to the glass at points determined by the position of said bubbles, applying a retarding force to said surface portions of glass and accelerating the forward and upward movement of the glass at a greater depth, and restricting the application of said gas to said single line.

5. The method of melting and refining glass which comprises introducing glass batch material into a melting and refining tank at one end thereof, applying heat to the upper surface of the batch of glass within the tank and thereby gradually melting the batch, withdrawing the molten glass from the opposite end of the tank as the melting operation proceeds and thereby causing a slow forward movement of the mass of glass within the tank, and controlling the current flow of glass within said mass by causing a localized upward force to be applied to the glass at and in a vertical plane extending transversely of the tank, intermediate the ends thereof with said plane located forwardly beyond the melting zone, and thereby causing the glass in and adjoining said plane to move upwardly and exert a pulling force on the lower strata of glass in the tank by which an accelerated forward movement of the glass along the bottom of the tank is produced while said upwardly moving glass applies to the surface portion of the glass a force opposing the tendency to accelerated forward movement of said surface portion under the influence of the heat applied thereto.

6. The method of melting and refining glass which comprises introducing glass batch material into a melting and refining tank at one end thereof, applying heat to the upper surface of the batch of glass within the tank and thereby gradually melting the batch, withdrawing the molten glass from the opposite end of the tank as the melting operation proceeds and thereby causing a slow forward movement of the mass of glass within the tank, and causing localized upward forces to be applied to the molten glass at a multiplicity of points distributed throughout a restricted area defined by a substantially vertical plane located at an intermediate position between the ends of the tank and forwardly beyond the glass melting zone, thereby causing an upward movement of a curtain of glass at said plane accompanied by a forward drawing movement of the glass in the lower portion of the tank, the upwardly moving curtain of glass at the same time applying to the surface portion of the body of glass a force opposing the tendency of said surface portion of the glass to advance at a higher speed than the lower strata of glass.

JOSEPH W. WRIGHT.